No. 723,628. PATENTED MAR. 24, 1903.
W. E. J. VAVASOUR.
STEAM PRESSURE ENGINE.
APPLICATION FILED DEC. 26, 1902.
NO MODEL. 6 SHEETS—SHEET 4.

Witnesses
Chas. H. Smith
J. Staib

Inventor
W. E. J. Vavasour
per L. W. Serrell & Son
Attys

No. 723,628. PATENTED MAR. 24, 1903.
W. E. J. VAVASOUR.
STEAM PRESSURE ENGINE.
APPLICATION FILED DEC. 26, 1902.
NO MODEL. 6 SHEETS—SHEET 5.

FIG. 8.

No. 723,628. PATENTED MAR. 24, 1903.
W. E. J. VAVASOUR.
STEAM PRESSURE ENGINE.
APPLICATION FILED DEC. 26, 1902.
NO MODEL. 6 SHEETS—SHEET 6.

UNITED STATES PATENT OFFICE.

WILLIAM E. J. VAVASOUR, OF TADCASTER, ENGLAND.

STEAM-PRESSURE ENGINE.

SPECIFICATION forming part of Letters Patent No. 723,628, dated March 24, 1903.

Application filed December 26, 1902. Serial No. 136,551. (No model.)

*To all whom it may concern:*

Be it known that I, WILLIAM E. J. VAVASOUR, baronet, a subject of the King of Great Britain, and a resident of Tadcaster, in the county of York, England, have invented certain new and useful Improved Steam and other Fluid Pressure Engines, of which the following is a specification.

This invention relates to the arrangements and combinations of parts, as hereinafter described and claimed, composing an improved steam or other fluid pressure engine in which the pressure-supply conduits are as nearly as possible equal in cross-sectional area to the area of the piston and extend with the same sectional area and passage-way from the cylinder to the source of fluid-pressure, such as the steam-generator, so as to entirely obviate frictional resistance of the fluid-pressure due to contracted passages, intricate turnings, and small ports and valve-openings common to engines as ordinarily constructed.

In conjunction with this feature my improved engine comprises a double-headed piston, the said piston-heads being located in separate cylinders which are coaxially arranged, are of equal diameters, and have their adjacent ends open, the two pistons being connected by a piston-rod. The outer ends of the pistons in the cylinders are alternately acted upon by the fluid-pressure, so that at each action the entire area of the piston is effective and the area of the pistons acted upon by the pressure is always equal, whereby a more even action is secured, while with such a construction much of the friction ordinarily due to packings connected with the piston-rods and the like is dispensed with.

Further, the combination of parts composing my improved engine also includes devices for operating the valves.

My improved fluid-pressure engine will now be described with reference to the accompanying drawings.

The drawings show my device adapted as a double-action high-pressure steam-engine, and, as aforesaid, I employ a double-headed piston consisting of two separate pistons 1 2, connected by a piston-rod 3, the piston 1 being located in a cylinder 4, while the piston 2 is located in a cylinder 5, the adjacent ends of the cylinders 4 5 being open. Carried by the piston-rod 3 between the adjacent open ends of the cylinders and centrally of the rod is a cross-shaft 6, extending laterally and having slippers 7, Figs. 2 and 3, guided in their reciprocating motions in guideways 8, formed on or fixed to the bed-plate 9 of the engine. Beyond these guideways 8 the cross-shaft 6 extends and receives, as clearly shown at Figs. 1 and 2, the front ends of connecting-rods 10. The two connecting-rods 10 extend to the cranks of the motor-driving shaft of the engine, which is of the ordinary construction, and therefore it is not considered necessary to illustrate the same in the drawings.

Figure 1:
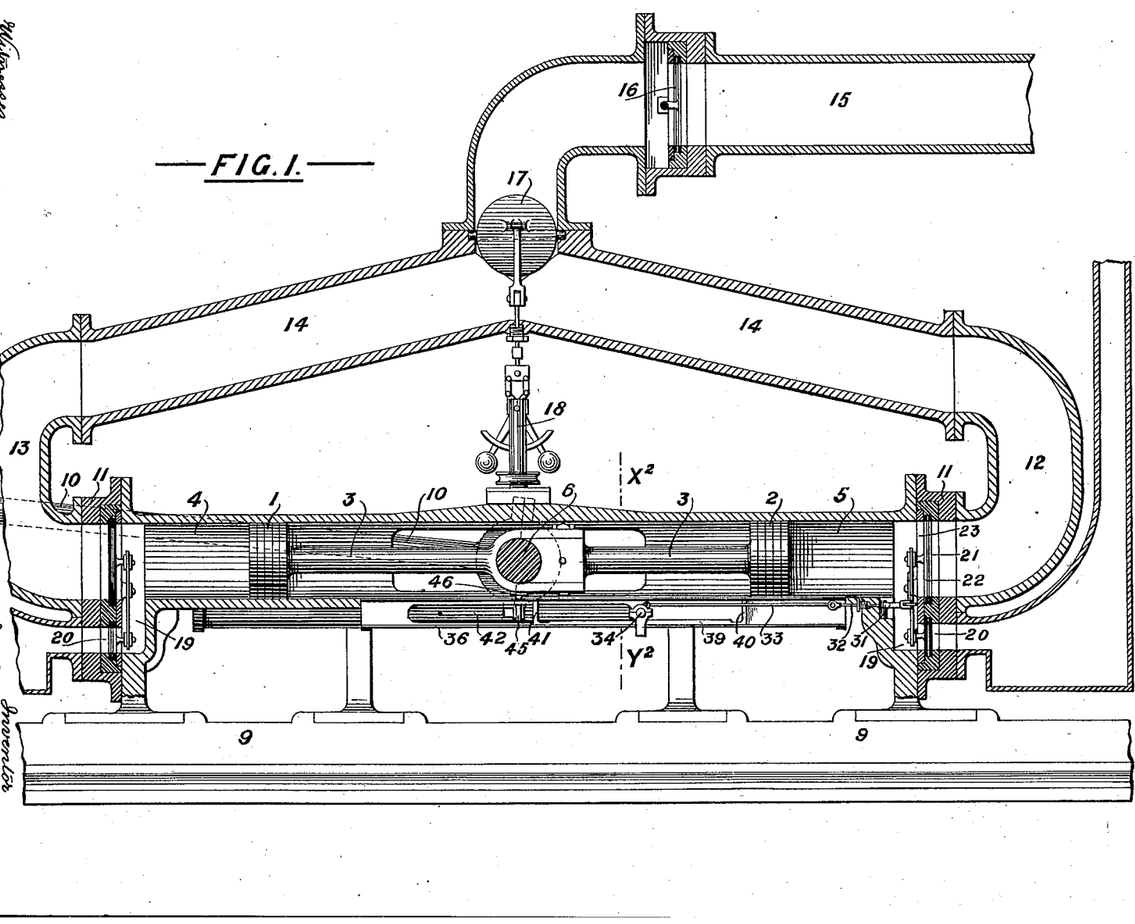
Figure 1 is an irregular vertical section of the engine, taken about the line X Y of Fig. 5.
Figure 2:
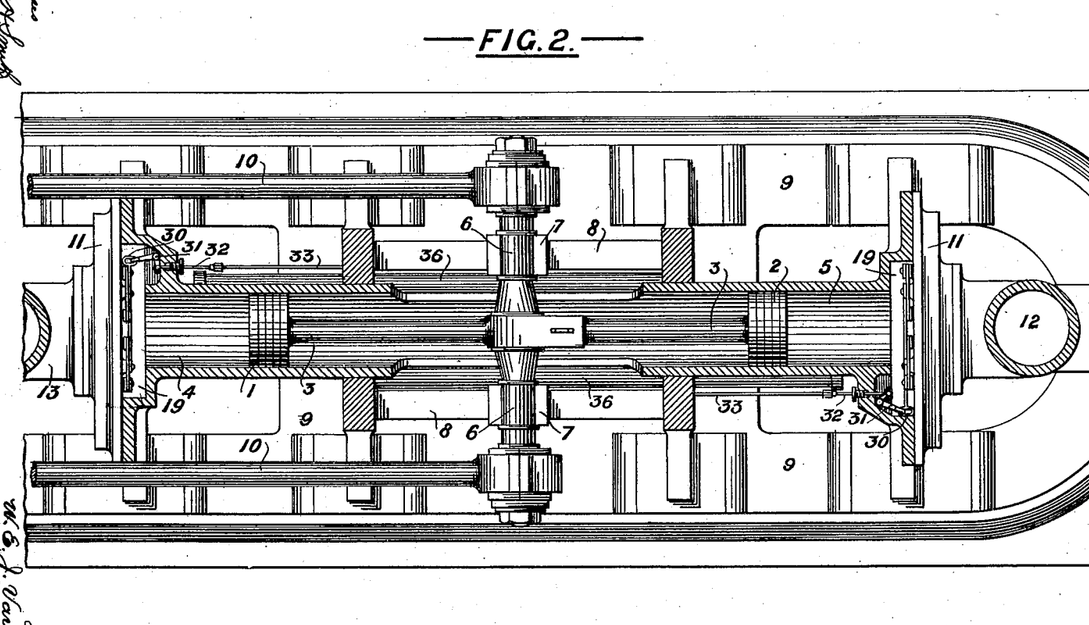
Fig. 2 is a plan view of the same engine, the cylinders being shown in section.
Figure 3:
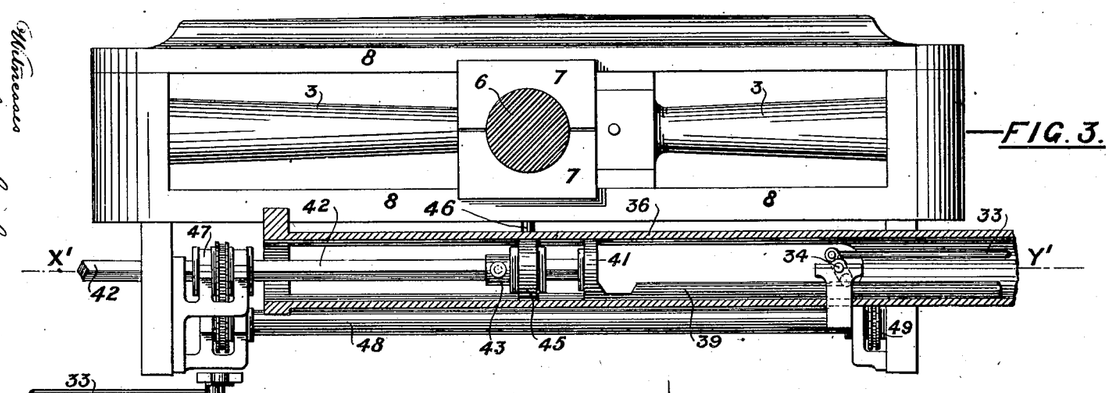
Fig. 3 is a sectional elevation drawn to a larger scale than the previous figures to show a portion of the valve-operating mechanism located below the cylinders.

I have described the cylinders 4 5 as being separate; but obviously, as I have shown in the drawings at Figs. 1 and 2, those cylinders can be conveniently formed in one casting, or they may be in sections permanently connected together, and the guideways for the cross-head slides 7 might well be formed as portions of the same casting, and all might be permanently connected and supported from the bed-plate 9.

With the cylinders and pistons of the type herein stated my object is to deliver the pressure-steam directly into the outer ends of the cylinders by passages or conduits which are equal or nearly equal in cross-sectional area with the cross-sectional area of the cylinders themselves, and since the full area of the pistons themselves is acted upon I obtain the full benefit of the steam-pressure from the generator or other source. Not only does my construction and combination present this advantage, but also I dispense with the employment of packing for the piston-rods ordinarily employed, and thereby lessen friction and reduce the number of wearing parts. I therefore, as aforesaid, deliver the pressure-steam directly into the outer ends of the cylinders by valve-controlled passages, which are practically coaxial and are equal or nearly equal in cross-sectional area to the cross-sectional area of the cylinders themselves. To this end also I fix to the outer end of each cylinder a valve-casing 11 to carry a valve which when open is equal to the cross-sectional area of the cylinders, and to these valve-casings 11 the steam is supplied by the steam-pipes 12 13, of similar and equal cross-sectional area, the pipes 12 13 being connected in the arrangement shown by a pipe 14, which is supplied direct from the steam-generator by conducting-pipes 15, the supply from the pipe 15 to the pipes 14 being controlled by a suitable valve, such as is indicated at 16, and governed by a suitable or an approved construction of throttle-valve 17, operated by a governor of any ordinary type 18, driven from the main shaft of the engine. Obviously the pipes 12 13 may each separately communicate with the steam-generator directly, if so desired. The exhaust from the cylinders passes off by passages 19 through valves 20, Fig. 1.

Figure 14:
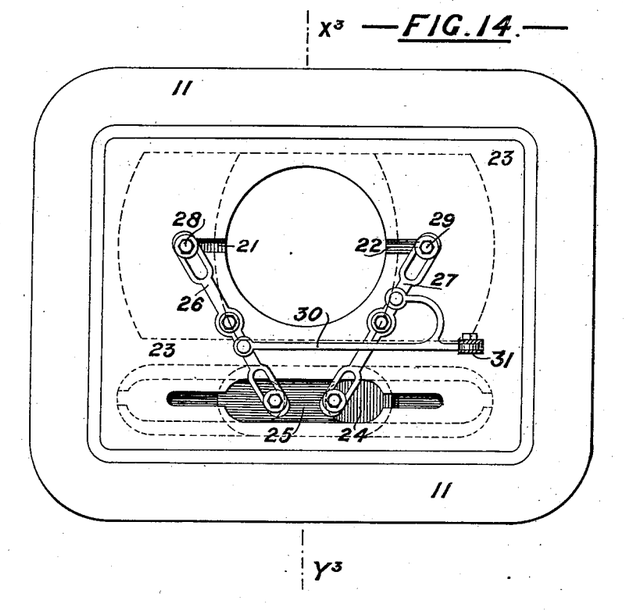
Fig. 14 is a face view of the valve-casing, drawn to a larger scale than Fig. 1, showing the supply-valve open and the exhaust-valve closed.
Figure 15:
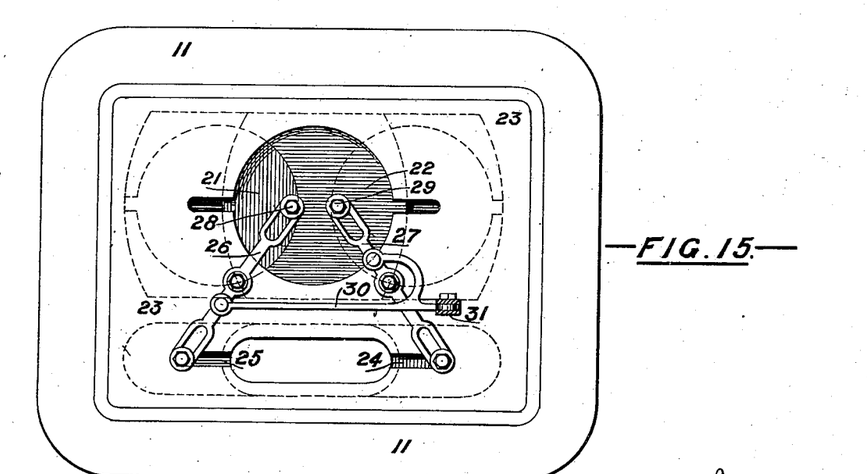
Fig. 15 is a similar view of the valve-casing to that shown at Fig. 14, but with the supply-valve closed and the exhaust open.
Figure 16:
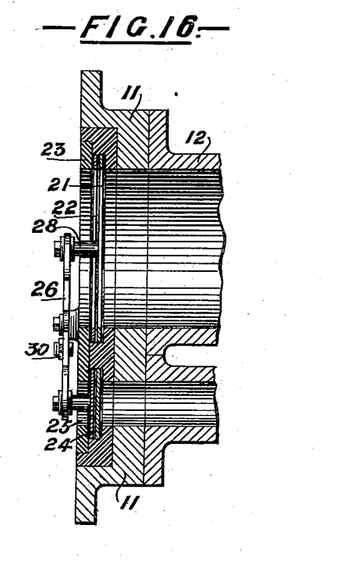
Fig. 16 is a vertical section on the line $X^3$ $Y^3$ of Fig. 14.

A type of valve eminently suitable for employment in my improved engine I have illustrated at Figs. 14 to 16 in further detail, although such a construction of valve is not new alone. The valve referred to consists of two superposed shutters 21 22, located in guideways in the valve-casing 11 and extending transversely across the outer ends of the cylinders, and these shutters 21 22, governing the steam-supply, are capable of rectilinear sliding motions in opposite directions in the said guideways. An aperture is formed through each shutter in such relative position in the shutters 21 22 that when the latter are in one position relatively to each other, as at Fig. 14, the passage-way is completely open and is preferably of or about the same sectional area as the cylinder. The shutters slide against a face-plate 23, which extends entirely across the guideways, and this face-plate is formed with an aperture of the same size and coaxial with the passage of the conduit. When the shutters 21 22 are slid into another position, as at Fig. 15, the apertures therein do not coincide and the passage-way is closed. In the same valve-casing 11, below the shutters 21 22, I provide two similar shutters 24 25 to govern the exhaust-aperture of the cylinder, and these shutters are likewise formed with apertures which can be brought to coincide to open the exhaust or not to coincide to close the exhaust-passage. With a valve so constructed I provide means for giving the requisite sliding motion to the shutters, and such means, as shown at Figs. 14, 15, consist of levers 26 27, pivoted to the face-plate 23, the upper arms of the said levers being respectively pivoted to studs 28 29, which extend through slots in the face-plate, Fig. 14, from the shutters 21 22, while the lower ends of the same levers 26 27 engage studs projecting, respectively, from the two shutters 24 25 of the exhaust-ports, and with this arrangement when the shutters 21 22 are placed so that the steam-supply is open the shutters 24 25 will be so placed that the exhaust-valve is closed.

The valve-levers 26 27 are connected by a bifurcated operating-rod 30, one fork of which is pivoted above the fulcrum of the lever 27, while the other fork is pivoted to the lever 26 below the fulcrum and so that rectilinear motion of the operating-rod will close the steam-admittance valve and simultaneously open the steam-exhaust valve, and vice versa.

Figure 6:
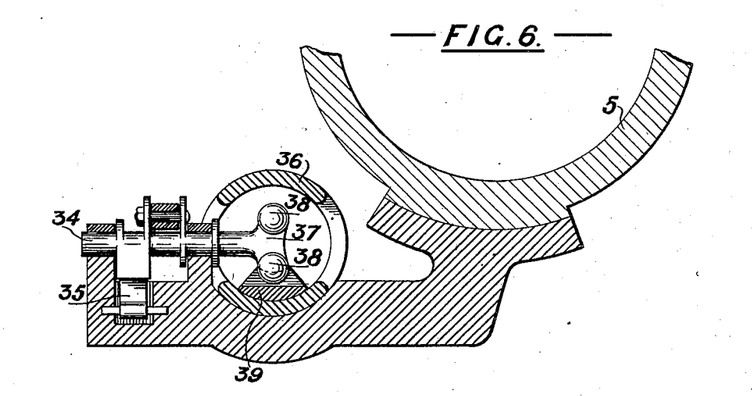
Fig. 6 is a similar view to that shown at Fig. 5 drawn to a larger scale and illustrating a portion of the trigger mechanism by which the valves are operated, Fig. 7 being a side sectional elevation of the valve-operating mechanism shown at Fig. 6.
Figure 7:
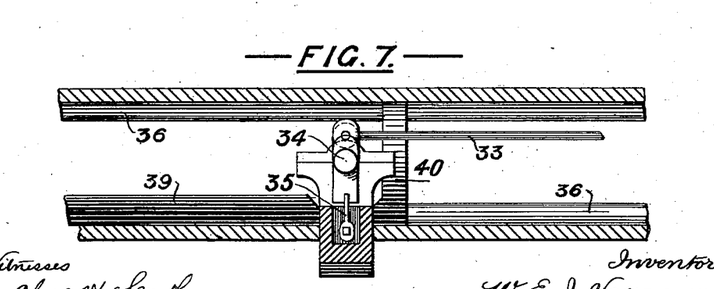

To give the necessary motion to the valve-operating rod 30, the latter is pivoted to a bell-crank lever 31, Fig. 2, while the other arm of the same bell-crank lever is pivoted to a rod 32, Fig. 1, passing through a gland in the cylinder-casting. To the outer end of the valve-rod 32 is pivoted a connecting-rod 33, Fig. 1, which extends, as is shown at Figs. 6 and 7, to a crank on a rock-shaft 34. The rock-shaft 34 is carried in bearings upon the frame or bed-plate of the engine or upon a bracket fixed thereto and is normally supported in one angular position by any convenient means—such, for instance, as a spring 35, Fig. 7. The end of the rock-shaft 34 projects through the open sides of a guide-cylinder 36 into the interior thereof and at its end is formed with a T-shaped head 37, the ends of the arms thereof being spherical or carrying bowls 38, and by the action of the spring 35 aforesaid this arm is normally maintained in a vertical position.

Within the guide-cylinder 36, into which the head of the rock-shaft 34 extends, there is a slide-plate 39, which is shown on a larger scale at Figs. 8 to 13, and this slide-plate 39 has two circular ends 40 41, which fit or nearly fit the guide-cylinder 36, there being a depression in the plate 39 near the two ends 40 41 of the said slide-plate, and the slide-plate 39 is reciprocated, as hereinafter described.

In order to give motion to the slide-plate 39, there is a rod 42 connected to one of the circular ends 41 and extending axially within the guide-cylinder 36.

Figure 4:
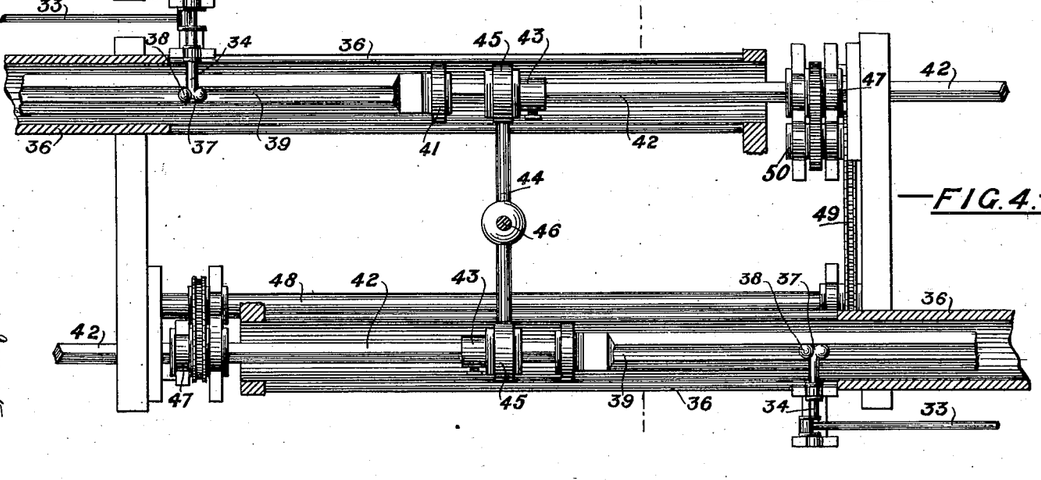
Fig. 4 is a plan section of the valve-operating arrangement shown at Fig. 2, taken about the line $X'$ $Y'$ of Fig. 3.

Upon the slide-operating rod 42, which is square in cross-section, there is fixed a flanged collar 43, Fig. 4, which is adjustable lengthwise upon the rod 42.

Figure 5:
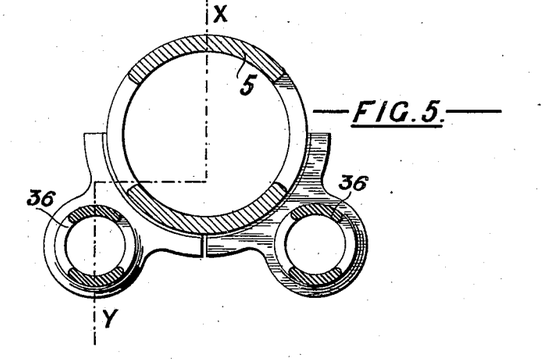
Fig. 5 is a transverse vertical section taken about centrally between the cylinders about the line $X^2$ $Y^2$ of Fig. 1.
Figure 9:
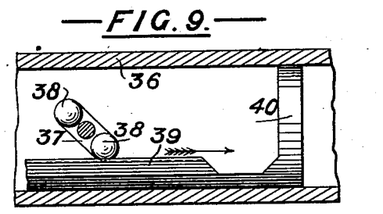
Figure 10:
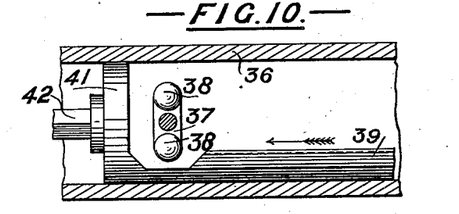
Figure 11:
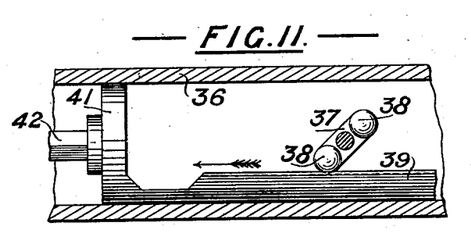

So far I have described the operating means for the valves at the end of one of the cylinders—say the cylinder 5, Fig. 1—but I would have it understood that similar operating means and similar valves are fitted at the end of the other cylinder, 4, the guide-cylinder of such operating means for the cylinder 4 being located below one side of the cylinder-axis and the guide-cylinder for the valve mechanism for the steam-cylinder 5 being fitted at the other side and below the axis of the latter cylinder, and the position of these guide-cylinders is clearly shown at Fig. 5. This being so, the two flanged collars 43 upon the slide-rods 42 are connected by a cross-arm 44, having end rings 45, which engage between the flanges of the collars 43, and centrally the cross-rod 44 is connected by a vertical rod 46 to the reciprocating cross-head between the cylinders. Thus when the pistons reciprocate within the cylinders 4 5 the slide-rods 42 will accompany those motions and carry the slide-plates 39, the raised central portions of which latter operate to rock the T-shaped head 37 into an angular position, as is shown at Figs. 9 and 11, and operate the valves, say, to open the steam-supply valve and close the exhaust-valve, holding the valves in that position until the sliding plate is near the end of its travel, when the T-shaped head 37 will come into the gap of the slide-plate 39, be brought to its vertical position by the spring 35, and the next sliding movement in the reverse direction of the slide-plate 39 will close the steam-supply and open the exhaust-valve.

Figure 8:
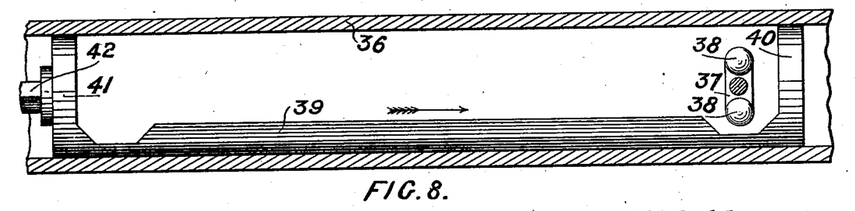
Figs. 8, 9, 10, and 11 show the valve-trigger and its operative device in several positions hereinafter referred to in the description and drawn to a large scale.
Figure 12:
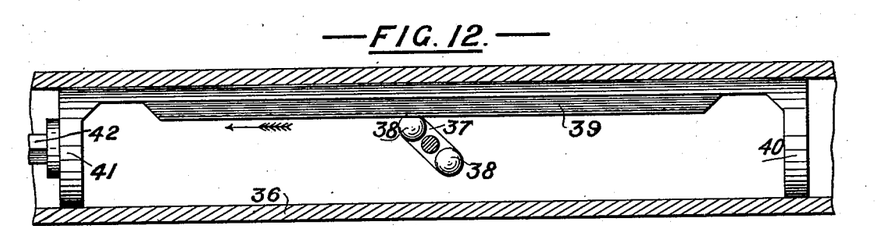
Figs. 12 and 13 show the same valve mechanism, but with the operative device reversed for reversing the motion of the engine.
Figure 13:
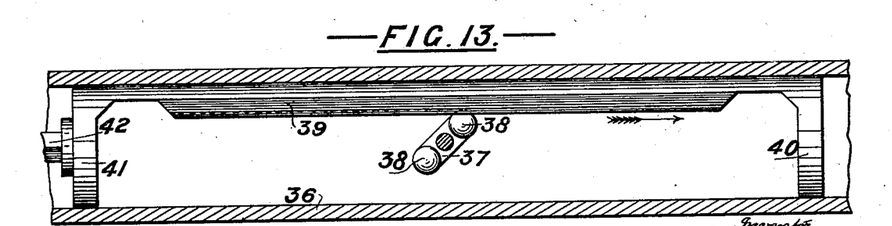

It will now be seen that by constructing the sliding plates with cylindrical ends, as shown, the said plates can be revolved through an angle of one hundred and eighty degrees in the guide-cylinders 36 from the position shown at Fig. 8 to the position shown at Fig. 12, and the order of the opening and closing of the valves can thus be reversed, and consequently the reversal of motion of the engine can be thus effected. The mechanism I provide for carrying out this operation consists as follows: The slide-rod 42, which, as I have before said, is square in cross-section, extends and slides through a collar 47, carried in bearings upon the framework of the engine, in which bearings the collar 47 can be revolved, so that by turning those collars through one hundred and eighty degrees the slide-plates 39 can be reversed within the guide-cylinders 36. Any suitable means may be employed for turning these collars 47 through the necessary angles; but the same may be conveniently effected by connecting one of the guide-collars 47 by a chain to a shaft 48, mounted in bearings parallel with the guide-cylinders 36, the opposite end of the shaft being fitted with a sprocket-wheel to drive by a chain 49 a shaft 50, also mounted in bearings, and the shaft 50 carries a gear-wheel gearing with the teeth of a gear-wheel fixed upon the rotary collar 47, through which the other slide-rod 42 passes. Thus by rotating one of the slide-rods 42 through the necessary angle by any suitable means—for instance, by a hand-operated handle—the operation of one of such rods will produce the proper adjustment of the other rod.

The operation of the engine is as follows: The pressure-steam comes direct from the generator by the steam-pipe 15, Fig. 1, and passes through the valve 16, which is practically of the same cross-sectional area of opening. This valve may be of any approved construction, but that indicated in the section at Fig. 1 shows the valve 16 to be of a similar construction to the steam-admittance valves described in the specification. The pressure-steam then passes the throttle-valve 17 and enters the pipes 14, 13, and 12. In the drawings, at Fig. 1, the steam-supply valve to the cylinder 5 is open, and the steam passing through that valve acts fully upon the entire area of the piston 2, being wholly unimpeded by contracted passages, and therefore acts thereon with its maximum pressure. The piston-head 2, and consequently the piston-head 1, moves toward the left of Fig. 1 (the exhaust-valve upon the left-hand side being open) and by the connecting-rods 10 drives the motor-shaft of the engine, and at the same time the rod 44 accompanies the motion, owing to its connection 46 with the cross-head. The slide-operating rods 42 also follow the motion, carrying with them the slide-plates 39, and the guide-cylinders 36 are so relatively situated that the upstanding parts of the slide-plates 39, Fig. 8, are simultaneously brought away from the T-shaped heads 37. These heads 37 instantly resume their normal vertical positions, as shown at Fig. 8, by the action of the springs 35, Fig. 7, and immediately as the piston-heads 1 2 commence their return motion, the upstanding slide-plates 39 act on the T-shaped heads, and place them in an angular position the reverse of that angular position which they previously occupied. This motion, through the connecting-rods 33 and the crank-levers 31, operates the bifurcated rods 30 of the valves at the ends of the cylinders, opening the left-hand steam-supply valve of Fig. 1, closing the adjacent exhaust-valve, closing the steam-supply valve at the end of the cylinder 5, and opening the exhaust-valve for the same cylinder. The piston-heads then travel in the reverse direction, and at the end of their travel the angular positions of the T-shaped heads 37 are again changed by the slide-plates 39, and so the movements continue automatically. As before explained, a reversal of the order of motions of the valves for reversing the direction of motion of the engine can be readily effected by the rotation of the slide-rods 42, which act to bring the sliding plates from the position shown at Fig. 8 to the position shown at Fig. 12. By this valve motion, as described, the valves are fully opened and fully closed and permit the engine to work non-expansively, which can be economically and advantageously done with the engine according to my invention constructed as hereinbefore described, although, of course, I would have it understood that the valves might be so adjusted or constructed as to cause the engine to work expansively.

What I claim as my invention, and desire to secure by Letters Patent, is—

1. In fluid-pressure engines, the combination with two coaxially-arranged cylinders of equal diameters, the adjacent ends being open, a piston in each cylinder, a piston-rod connecting the two pistons, a cross-shaft extending transversely of the piston-rod and connected centrally thereto, slippers on the cross-shaft, guideways on each side of the cylinder to support the slippers in their reciprocating motions, and connecting-rods from the cross-shaft to the motor crank-shaft; of a fluid-pressure-supply tube from the source of fluid-pressure to the outer end of each cylinder, the supply-tubes being equal to the cylinders in cross-sectional area, a pressure-supply valve at the outer end of each cylinder having a passage-way equal in diameter to that of the cylinder, an exhaust-port formed laterally in the walls of each cylinder in the outer ends thereof, exhaust-valves to govern the exhaust-ports, and means for operating the supply and exhaust-valves, substantially as described.

2. In a fluid-pressure engine, the combination with two coaxially-arranged cylinders of equal diameters having their adjacent ends open, a fluid-pressure-supply tube connected to the outer end of each cylinder, the said tubes being connected exterior of the cylinders, and a supply-tube entering the conjoined tubes aforesaid and communicating directly with the source of fluid-pressure, all the fluid-pressure-supply tubes being equal to the cylinders in cross-sectional area; of a piston in each cylinder, a piston-rod connecting the two pistons, a cross-shaft extending transversely of the piston-rod and connected centrally thereof, slippers on the cross-shaft, guides on each side of the cylinder to support the slippers in their reciprocating motions, connecting-rods on the cross-shaft extending to the motor crank-shaft of the engine, a pressure-supply valve at the outer end of each cylinder, the supply-valve passage-way being about equal to the cross-sectional area of the cylinder, an exhaust-port formed laterally in the cylinders near the outer ends thereof, exhaust-valves for governing the exhaust-ports, and means for operating the supply and exhaust valves, substantially as described.

3. In a fluid-pressure engine, the combination with two coaxially-arranged cylinders of equal diameters, the adjacent ends being open, a piston in each cylinder, a piston-rod connecting the two pistons, a cross-shaft extending transversely of the piston-rod and connected centrally thereto, means for guiding the cross-shaft in its reciprocations, connections from the cross-shaft to the motor crank-shaft for driving the latter, a fluid-pressure-supply tube from the source of fluid-pressure to the outer end of each cylinder equal in cross-sectional area to the said cylinder, an inlet-valve at the outer end of each cylinder having a passage-way equal to the cross-sectional area of the cylinder, a lateral exhaust-port at the outer end of each cylinder, and a valve to govern the exhaust-port; of valve-operating mechanism consisting for each steam-cylinder, of a slide-plate having a recess at each end thereof, means for guiding the plate in its reciprocations, a connection from the slide-plate to the reciprocating cross-shaft to cause the slide-plate to accompany the reciprocations of the pistons, a rock-shaft 34, stationary bearings to carry the rock-shaft, a crank on the rock-shaft, connections from the crank to operate the inlet and exhaust valves, a T-head on the rock-shaft to coact with the slide-plate, and means for causing the T-head to assume a vertical position when freed from the angular positions which the T-head is caused to assume by the upstanding part of the slide-plate, substantially as described.

4. In a fluid-pressure engine, the combination with two coaxially-arranged cylinders of equal diameters, the adjacent ends being open, a piston in each cylinder, a piston-rod connecting the two pistons, a cross-shaft extending transversely of the piston-rod and connected centrally thereto, slippers on the cross-shaft, guideways on each side of the cylinder to support the slippers in their reciprocating motion, connecting-rods from the cross-shaft to the motor crank-shaft, and a fluid-pressure-supply tube from the source of fluid-pressure to the outer end of each cylinder, the supply-tubes being equal to the cylinders in cross-sectional area; of a sliding pressure-supply valve at the outer end of each cylinder, the passage-way of which valve is equal to the cross-sectional area of the cylinder, an exhaust-port formed laterally in each cylinder near the outer end thereof and extending below the supply-valve, sliding exhaust-valves to govern the exhaust-ports, and mechanism for operating the supply and exhaust valves, consisting of a guide-cylinder for each steam-cylinder arranged parallel with the steam-cylinders, a slide-plate 39 in each guide-cylinder, a slide-rod 42 extending from the opposite ends of each slide-plate, a cross-arm having its ends adjustably connected to the slide-rods, and a connection from the cross-head of the engine to the cross-arm 44 to cause the slide-plate to follow the motions of the pistons, a rock-shaft for each cylinder mounted in stationary bearings adjacent thereto, connections from a crank on the rock-shaft for operating the supply and exhaust valves, a T-shaped head on the end of the rock-shaft entering the guide-cylinder to coact with the slide-plate, means for resiliently bringing the T-shaped head into a vertical position when free, recesses in the slide-plate 39 near each end thereof to permit the T-shaped head to assume its vertical position, and an upstanding part on the slide-plate to rock the T-head in one direction to open the inlet and close the exhaust, and to rock the T-head in the reverse direction at the next motion to close the inlet and open the exhaust, substantially as set forth.

5. In a fluid-pressure engine, the combination with two coaxially-arranged cylinders of equal diameters, the adjacent ends being open, a piston in each cylinder, a piston-rod connecting the two pistons, a cross-shaft extending transversely of the piston-rod, and connected centrally thereto, means for guiding the cross-shaft in its reciprocations, connections from the cross-shaft to the motor crank-shaft for driving the latter, a fluid-pressure-supply tube from the source of fluid-pressure to the outer end of each cylinder equal in cross-sectional area to the said cylinder, an inlet-valve at the outer end of each cylinder, having a passage-way equal to the cross-sectional area of the cylinder, a lateral exhaust-port at the outer end of each cylinder, and a valve to govern the exhaust-port; of valve-operating mechanism consisting of two guide-cylinders 36, slots formed in the sides of each cylinder 36, a slide-plate 39 in each guide-cylinder, circular ends to the plate to fit the said cylinder, a connection from the reciprocating cross-head of the engine for reciprocating the slide-plate, a rock-shaft 37, stationary bearings to carry the rock-shaft, a crank on the rock-shaft, connections from the crank to the supply and exhaust valves for alternately opening and closing the same when the shaft 34 is rocked, a T-head 37 on the rock-shaft 34 entering the guide-cylinder between the circular ends of the guide-plate, and means for causing the T-head to assume a vertical position when the ends of the slide-plate 39 are adjacent to the T-head, and an upstanding part on the slide-plate 39 to rock the T-head into an angular position in one direction during the forward movement of the slide-plate 39 and to cause it to assume an opposite angular position upon a return motion of the plate 39, and means for revolving the plate 39 in the guide-cylinder through one hundred and eighty degrees to reverse the angular positions of the T-head and thereby the operation of the valves for reversing the engine, substantially as described.

6. In a fluid-pressure engine, the combination with two coaxial cylinders of equal diameters, the adjacent ends being open and at a distance apart, an open-sided frame connecting the open ends of the two cylinders, a bed-plate to carry the two cylinders, a piston in each cylinder, a rod connecting the two pistons, a cross-shaft connected to the rod, means for guiding the cross-shaft in its reciprocating motions, connections from the cross-shaft to the main crank-shaft for driving the latter, a fluid-pressure-supply tube to the end of each cylinder, the tubes being of equal cross-sectional area to the cylinders, a supply-valve at the end of each cylinder of an area equal to the same cylinder, a lateral exhaust-port at the end of each cylinder, and an exhaust-valve to each exhaust-port; of means for operating the inlet and exhaust valves, consisting, for each steam-cylinder, of a rock-shaft 34 carried in stationary bearings, a crank on the rock-shaft, connections from the crank to the supply and exhaust valves to alternately open and close the same as the crank rocks to and fro, a T-head on the rock-shaft 34, means for causing the T-head to assume a vertical position when free, a guide-cylinder having slotted sides into which cylinder the T-head enters, a slide-plate in the guide-cylinder, means for causing the plate to follow the reciprocations of the pistons, an upstanding part on the plate to rock the rock-shaft in one direction or the other when it comes beneath or above the T-shaped head according to the direction of travel of the slide-plate, and means for simultaneously rotating the slide-plates in the guide-cylinders through an angle of one hundred and eighty degrees to change the direction of rocking motion of the rock-shaft 34, and to reverse the engine, substantially as described.

WILLIAM E. J. VAVASOUR.

Witnesses:
H. CLARKE,
T. LAWSON KILHAM.